(12) United States Patent
Choung et al.

(10) Patent No.: US 10,208,688 B2
(45) Date of Patent: Feb. 19, 2019

(54) EXHAUST GAS PURIFICATION APPARATUS AND METHOD FOR CONTROLLING THE SAME

(71) Applicants: Hyundai Motor Company, Seoul (KR); Kia Motors Corporation, Seoul (KR); Hyundai Kefico Corporation, Gunpo-si (KR)

(72) Inventors: Jin Woo Choung, Suwon-si (KR); SooMin Lee, Seongnam-si (KR); SungJae Kim, Gwacheon-si (KR)

(73) Assignees: Hyundai Motor Company, Seoul (KR); Kia Motors Corporation, Seoul (KR); Hyundai Kefico Corporation, Gunpo-si (KR)

( * ) Notice: Subject to any disclaimer, the term of this patent is extended or adjusted under 35 U.S.C. 154(b) by 0 days.

(21) Appl. No.: 15/610,470

(22) Filed: May 31, 2017

(65) Prior Publication Data
US 2018/0163652 A1 Jun. 14, 2018

(30) Foreign Application Priority Data
Dec. 13, 2016 (KR) ........................ 10-2016-0169822

(51) Int. Cl.
*F01N 11/00* (2006.01)
*F02D 41/02* (2006.01)
(Continued)

(52) U.S. Cl.
CPC ....... *F02D 41/0295* (2013.01); *F01N 3/0864* (2013.01); *F01N 3/0885* (2013.01);
(Continued)

(58) Field of Classification Search
CPC ..... F02D 2200/0814; F02D 2200/0816; F01N 3/0864; F01N 3/101; F01N 3/2006; F01N 3/2033; F01N 2570/16; F01N 2900/1624
See application file for complete search history.

(56) References Cited

U.S. PATENT DOCUMENTS

| | | | |
|---|---|---|---|
| 6,336,320 B1 * | 1/2002 | Tanaka | F01N 3/0814 123/443 |
| 2008/0173008 A1 * | 7/2008 | Kidokoro | F01N 11/002 60/277 |

FOREIGN PATENT DOCUMENTS

| | | |
|---|---|---|
| JP | 4608758 B2 | 1/2011 |
| KR | 10-1048129 B1 | 7/2011 |
| KR | 10-1551017 B1 | 9/2015 |

* cited by examiner

*Primary Examiner* — Jonathan Matthias
(74) *Attorney, Agent, or Firm* — Morgan, Lewis & Bockius LLP (57) ABSTRACT

A method for controlling an exhaust gas purification apparatus as a catalyst oxygen purge control method during a cold engine period of an exhaust gas purification apparatus including a three way catalyst (TWC) converter purifying exhaust gas exhausted from the engine includes determining whether a fuel cut condition of an injector which injects the fuel to the combustion chamber is satisfied; performing a fuel cut of the injector when the fuel cut condition is satisfied; determining heat load of the three way catalyst by use of a temperature detector and an exhaust gas flow rate detector; measuring oxygen storage capacity (OSC) stored in the three way catalyst according to the heat load; determining an inflection point by use of variation amount of the OSC; and controlling oxygen purge period differently around the inflection point.

9 Claims, 13 Drawing Sheets

(51) Int. Cl.
*F01N 3/10* (2006.01)
*F02D 41/06* (2006.01)
*F02D 41/14* (2006.01)
*F02D 41/12* (2006.01)
*F01N 3/08* (2006.01)
*F01N 9/00* (2006.01)

(52) U.S. Cl.
CPC .............. *F01N 3/101* (2013.01); *F01N 9/00* (2013.01); *F01N 11/002* (2013.01); *F01N 11/007* (2013.01); *F02D 41/064* (2013.01); *F02D 41/126* (2013.01); *F02D 41/1454* (2013.01); *F01N 2430/00* (2013.01); *F01N 2900/1624* (2013.01); *F02D 41/1445* (2013.01); *F02D 2200/0802* (2013.01); *F02D 2200/0816* (2013.01)

EXHAUST GAS PURIFICATION APPARATUS AND METHOD FOR CONTROLLING THE SAME

CROSS-REFERENCE(S) TO RELATED APPLICATIONS

The present application claims priority to Korean Patent Application No. 10-2016-0169822 filed on Dec. 13, 2016, the entire contents of which are incorporated herein for all purposes by this reference.

BACKGROUND OF THE INVENTION

Field of the Invention

The present invention relates to an exhaust gas purification apparatus and method for controlling the same. More particularly, the present invention relates to an exhaust gas purification apparatus and method for controlling the same which adjusts an oxygen purge period after fuel-cut according to a degradation level of a three way catalyst to improve performance of a three way catalyst.

Description of Related Art

Recently, according to an increased usage of vehicles and increased traffic volume, air pollution due to exhaust gas has come to the fore as a serious social problem.

Therefore, governments of every country have set an emission standard of pollutants in exhaust gas such as carbon monoxide (CO), hydrocarbon (HC), nitrogen oxide ($NO_x$) and the like to regulate exhaust gas. Regulations on exhaust gas are becoming more and more strict.

Further, manufacturers of vehicles make a great effort to effectively cope with the regulations on exhaust gas which are becoming stricter. A novel vehicle is manufactured in accordance with an exhaust gas emission standard.

Particularly, to satisfy an exhaust gas emission standard, a three way catalyst converter in which a noble metal is immersed is disposed in an exhaust system of the vehicle to accelerate the oxidation of hydrocarbon, oxidation of carbon monoxide, and reduction of nitrogen oxide.

The three way catalyst refers to a catalyst which simultaneously reacts with a hydrocarbon based compound, carbon monoxide, and nitrogen oxide ($NO_x$) to remove these compounds and a Pt/Rh, Pd/Rh or Pt/Pd/Rh catalyst is mainly used.

The three way catalyst performs a function of reducing carbon monoxide and hydrocarbon or reducing nitrogen oxide in response to a change of a lean (excessive oxygen) state and a rich (excessive fuel) state with respect to the air-fuel ratio of exhaust gas.

In the meantime, in a fuel cut state, unburned air passes through the three way catalyst so that oxygen is stored in the three way catalyst. When fuel is reinjected, the purification rate of nitrogen oxide is significantly lowered due to the stored oxygen. To prevent the lowering of the purification rate, an oxygen purge ($O_2$ purge) function which excessively injects fuel at the time of reinjecting the fuel to consume oxygen is performed.

However, catalyst performance deteriorates as the three way catalyst degrades. When the three way catalyst is controlled in a region that the amount of oxygen storage capacity (OSC) is below a certain value, control becomes difficult since the variation of catalyst performance according to a variation of the OSC is large, therefore deterioration of the catalyst performance such as emissions etc. is generated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an exhaust gas purification apparatus and method for controlling the same which determines an inflection point by use of the variation amount of the OSC after fuel-cut during the cold engine period, and controls an oxygen purge period differently around the inflection point.

A method for controlling an exhaust gas purification apparatus in a form of a catalyst oxygen purge control method during a cold engine period includes a three way catalyst (TWC) converter purifying exhaust gas expelled from the engine may include determining whether a fuel cut condition of an injector which injects fuel to the combustion chamber is satisfied; performing a fuel cut of the injector when the fuel cut condition is satisfied; determining the heat load of the three way catalyst using a temperature detector and an exhaust gas flow rate detector; measuring the oxygen storage capacity (OSC) stored in the three way catalyst according to the heat load; determining an inflection point using the variation amount of the OSC; and controlling an oxygen purge period differently around the inflection point.

The inflection point may include a point wherein the decreasing rate of the variation amount of the OSC is changed.

In the determining of an inflection point, the heat load may be determined by accumulating temperature and exhaust gas flow rate of a front end portion of the three way catalyst, and a decreasing rate of the OSC may be determined by measuring the amount of the OSC according to the heat load, and when the absolute value of the decreasing rate of the OSC is below a certain value, it may be determined that the inflection point has past.

In the controlling of an oxygen purge period differently, when the variation amount of the OSC is before the inflection point, the oxygen purge period may be controlled to be increased linearly; and when the variation amount of the OSC is after the inflection point, the oxygen purge period may be controlled to have a predetermined set value.

The OSC may be measured using a chemical adsorption method, a simulation activation evaluation device, an engine, or a vehicle.

The OSC during vehicle driving may be measured in a state that the three way catalyst is disposed in the vehicle.

A criteria of the cold engine during the cold engine period may be that an exhaust gas temperature at a front end portion of the three way catalytic converter is lower than approximately 400° F. and the time is before activation of the three way catalyst.

A criteria of the cold engine during the cold engine period may be before approximately 200 seconds after starting the engine, and before the activation of the three way catalyst.

The oxygen purge period may be determined by the oxygen storage capacity of the three way catalyst.

Meanwhile, an exhaust gas purification apparatus according to an exemplary embodiment of the present invention includes a three way catalyst (TWC) disposed at an exhaust line which exhaust gas expelled from an engine passes, and changing harmful material including carbon monoxide, hydrocarbon, and nitrogen oxide included in the exhaust gas into harmless components; an oxygen detector configured for measuring oxygen storage capacity (OSC) stored in the three way catalyst; and a controller configured to determine the heat load of the three way catalyst and control the oxygen purge period by use of the variation amount of the OSC according to the heat load.

The controller may determine an inflection point wherein the decreasing rate of the variation amount of the OSC is changed, and controls the oxygen purge period differently around the inflection point.

The controller may control the oxygen purge period to be increased linearly when the variation amount of the OSC is before the inflection point, and control the oxygen purge period to have a predetermined set value when the variation amount of the OSC is after the inflection point.

As described above, according to an exemplary embodiment of the present invention, optimum control to three way catalyst performance is possible and exhaust gas purification performance may be improved by determining an inflection point using the variation amount of the OSC and controlling the oxygen purge period differently around the inflection point.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It will be understood that when an element is referred to as being "on" or "over" another element, it can be directly on the other element or intervening elements may also be present.

Hereinafter, an exhaust gas purification apparatus and method for controlling the same according to an exemplary embodiment of the present invention will be described with accompanying drawings.

Figure 1:
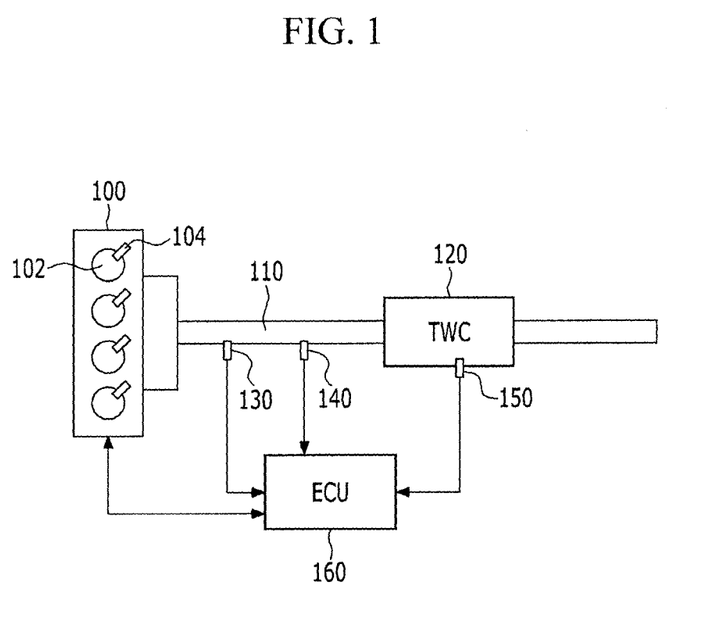
FIG. 1 is a schematic drawing illustrating an exhaust gas purification apparatus for improving three way catalyst performance according to an exemplary embodiment of the present invention.

FIG. 1 is a schematic drawing illustrating an exhaust gas purification apparatus for improving three way catalyst performance according to an exemplary embodiment of the present invention. The exhaust gas purification apparatus illustrates only a schematic configuration that is needed to describe the exemplary embodiment of the present invention, and is not limited to such a configuration.

Referring to FIG. 1, an exhaust gas purification apparatus according to an exemplary embodiment of the present invention includes an engine 100, a combustion chamber 102, an injector 104, an exhaust line 110, a three way catalyst (TWC) 120, a lambda detector 130, a temperature detector 140, an oxygen detector 150, and a controller 160.

Outside air is supplied to the combustion chamber 102 of the engine 100, the injector 104 injects a predetermined fuel amount to the combustion chamber 102 at a predetermined time, and the combusted exhaust gas is exhausted to outside through the three way catalyst 120 of the exhaust line 110.

The three way catalyst 120 is disposed in the exhaust line 110 which the exhaust gas expelled from the engine 100 passes, and changes harmful materials including carbon monoxide, hydrocarbon, and nitrogen oxide into harmless materials by an oxidation-reduction reaction.

The lambda detector 130 is configured to detect a lambda value of the exhaust gas passing through the exhaust line 110, transmits the present signal to the controller 160, and the controller 160 may control the injector 104 by use of the lambda value, and determine state whether or not the fuel of the injector 104 is cut.

The temperature detector 140 is disposed at a front or rear end portion of the three way catalyst 120, and configured to measure the temperature of the exhaust gas or the three way catalyst 120, and supplies the temperature information to the controller 160.

Further, the oxygen detector 150 is configured to measure an oxygen storage capacity (hereinafter, OSC) and to supply the measured oxygen storage capacity information to the controller 160. Here, it is described that the oxygen detector 150 is disposed at the three way catalyst 120, but the oxygen detector 150 may be disposed at a front or rear end portions, but is not limited thereto.

Meanwhile, the OSC may be measured using a chemical adsorption method, a simulation activation evaluation device, an engine, or a vehicle, and the OSC during vehicle driving may be measured in a state that the three way catalyst is disposed in the vehicle.

The controller 160 is configured to determine heat load of the three way catalyst 120 by use of information of the temperature measured at the temperature detector 140, and controls the oxygen purge period by use of a variation amount of the OSC according to the heat load.

The controller 160 controls the oxygen purge period to be increased linearly when the variation amount of the OSC is before the inflection point, and controller 160 controls the oxygen purge period to have a predetermined set value when the variation amount of the OSC is after the inflection point. Here, the predetermined set value includes predetermined values for maintaining catalyst performance on the basis of a distance value which is the warranty period of the catalyst.

For the present purpose, the controller 160 may be realized by at least one microprocessor operated by a predetermined program, and the predetermined program may be programmed to perform respective steps of the method for controlling an exhaust gas purification apparatus according to an exemplary embodiment of the present invention.

Figure 2:
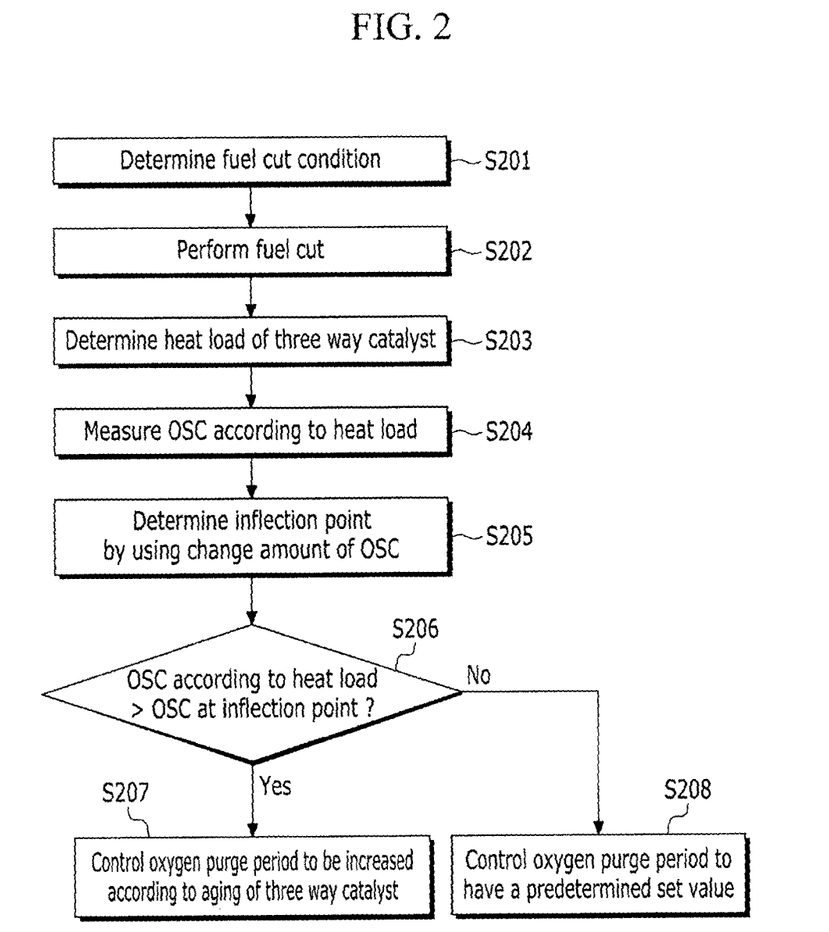
FIG. 2 is a schematic flow chart illustrating that the exhaust gas purification apparatus according to an exemplary embodiment of the present invention controls oxygen purge period for improving the three way catalyst performance.

FIG. 2 is a schematic flow chart illustrating that the exhaust gas purification apparatus according to an exemplary embodiment of the present invention controls the oxygen purge period to improve the three way catalyst performance. The flow chart below is described using same reference numerals connected to constituents of FIG. 1.

Referring to FIG. 2, in a method for controlling an exhaust gas purification apparatus in a form of a catalyst oxygen purge control method during a cold engine period of an exhaust gas purification apparatus including a three way catalyst (TWC) converter purifying exhaust gas expelled from the engine, firstly, whether a fuel cut condition of an injector which injects the fuel to the combustion chamber is satisfied is determined S201.

Next, when the fuel cut condition is satisfied, the fuel cut of the injector is performed S202.

Next, the exhaust gas purification apparatus according to an exemplary embodiment of the present invention determines the heat load of the three way catalyst 120 using a temperature detector and an exhaust gas flow rate detector S203.

Then, the exhaust gas purification apparatus measures the oxygen storage capacity (OSC) stored in the three way catalyst according to the heat load S204.

The exhaust gas purification apparatus determines an inflection point using the variation amount of the OSC S205. Here, the inflection point includes a point where the decreasing rate of the variation amount of the OSC is changed. The inflection point may include a point which reducing tendency according to catalyst aging time is critically and smoothly reduced.

The exhaust gas purification apparatus determines the heat load by accumulating the temperature and exhaust gas flow rate of a front end portion of the three way catalyst, and determines a decreasing rate of the OSC by measuring the amount of the OSC according to the heat load. Further, the exhaust gas purification apparatus may determine that the inflection point is past when the absolute value of the decreasing rate of the OSC is below a certain value.

Further, the exhaust gas purification apparatus may control the oxygen purge period according to the three way catalyst aging when the OSC value according to the heat load is bigger than the OSC value of the inflection point S206 and S207.

Further, the exhaust gas purification apparatus may control that the oxygen purge period has a predetermined set value when the OSC value is smaller than the OSC value of the inflection point S206 and S208. Here, the predetermined set value includes predetermined values for maintaining catalyst performance on the basis of a distance value which is the warranty period of the catalyst.

Figure 3:
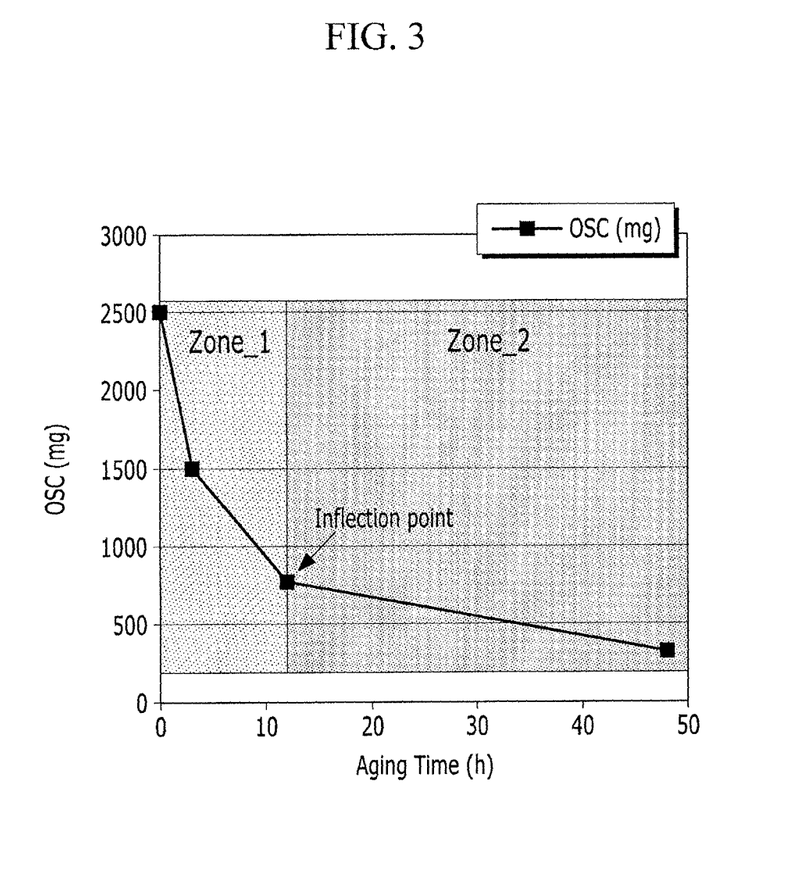
FIG. 3 is a graph illustrating variation of OSC according to aging of the three way catalyst according to an exemplary embodiment of the present invention.

FIG. 3 is a graph illustrating the variation of OSC according to aging of the three way catalyst according to an exemplary embodiment of the present invention.

The amount of the OSC of the three way catalyst reduces rapidly according to degradation at an initial stage, and the amount of the OSC reduces smoothly after a certain time. Accordingly, there is an inflection point which the variation tendency of the OSC changes as shown in FIG. 3, and it may be divided into a region that the OSC reduces rapidly (Zone_1) and a region that the OSC reduces smoothly (Zone_2) on the basis of the inflection point.

Before the inflection point (Zone_1), variation of the OSC according to aging time is large, but EM effect according to the variation of the OSC is small, so controlling the control variable related to the performance of the three way catalyst, that is the oxygen purge period, is easy.

However, after the inflection point (Zone_2), variation of the OSC according to aging time is small, but EM effect according to the variation of the OSC is sensitive, so controlling the control variable related to the performance of the three way catalyst, that is the oxygen purge period, is difficult.

Figure 4:
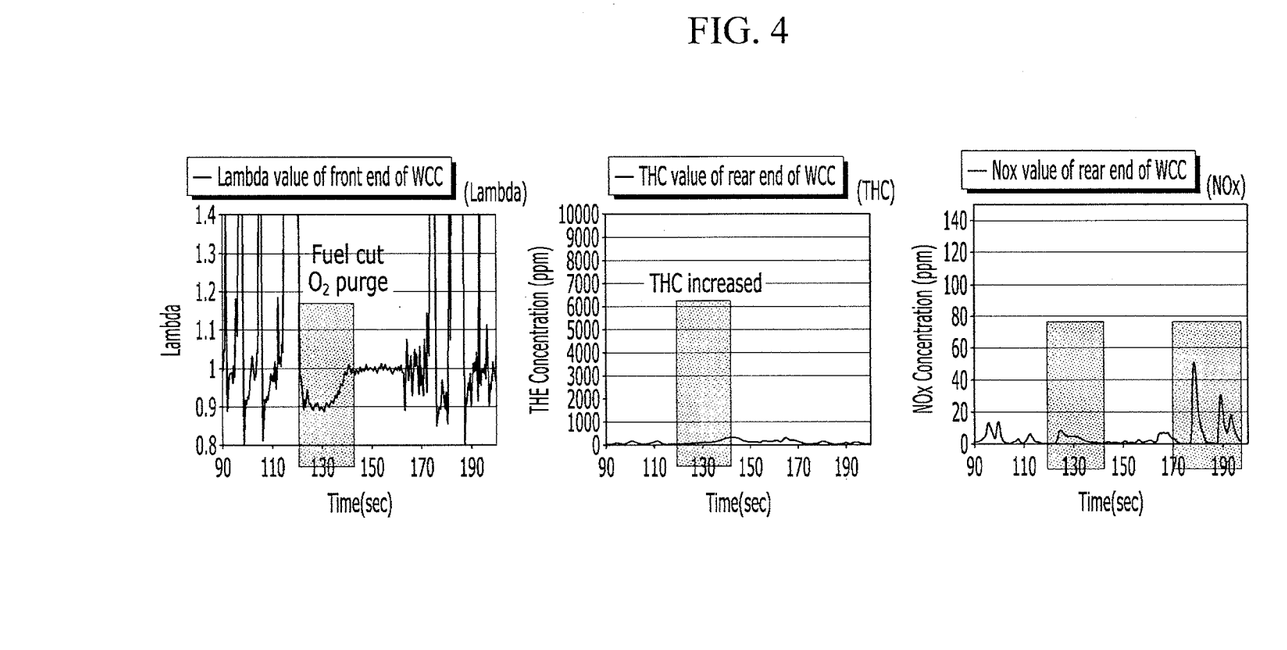
FIG. 4 is a graph illustrating an EM exhaust behavior when a catalyst oxygen purge of a 4 Kmile degraded product is performed during the cold engine period according to an exemplary embodiment of the present invention.
Figure 5:
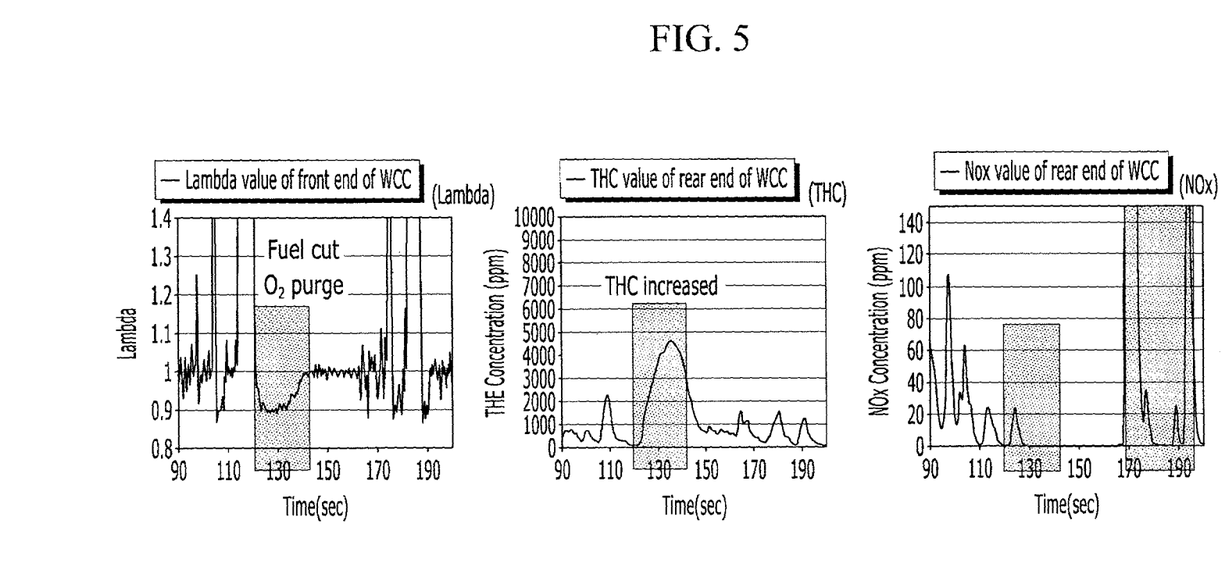
FIG. 5 is a graph illustrating an EM exhaust behavior when a catalyst oxygen purge of a 150 Kmile degraded product is performed during the cold engine period according to an exemplary embodiment of the present invention.

Meanwhile, FIG. 4 is a graph illustrating an EM exhaust behavior when a catalyst oxygen purge of a 4 Kmile degraded product is performed during the cold engine period according to an exemplary embodiment of the present invention, and FIG. 5 is a graph illustrating an EM exhaust behavior when a catalyst oxygen purge of a 150 Kmile degraded product is performed during the cold engine period according to an exemplary embodiment of the present invention.

Referring to FIG. 4, during the cold engine period when a three way catalyst exhaust temperature is approximately 400° F. or lower before approximately 200 seconds after starting the engine, a lambda value of a front end portion of the three way catalytic converter of the 4 Kmile degraded product, that is, an air-fuel ratio is lowered at the time of oxygen purge. The amount of exhausted hydrocarbon and nitrogen oxide which is measured at an exit WCC out of the three way catalytic converter is small. Further, referring to FIG. 5, during the cold engine period when a three way catalyst exhaust temperature is approximately 400° F. or lower before approximately 200 seconds after starting the engine, in the 150 Kmile degraded product, an emission amount of exhausted hydrocarbon and nitrogen oxide is increased at the time of oxygen purge.

As illustrated in FIG. 4 and FIG. 5, in the case of the 4 Kmile degraded product, which is a new product, the EM exhaust characteristic during the cold engine period is low. Further, in the case of a new product, the oxygen purge time is shortened so that the fuel efficiency may be further improved.

Figure 6:
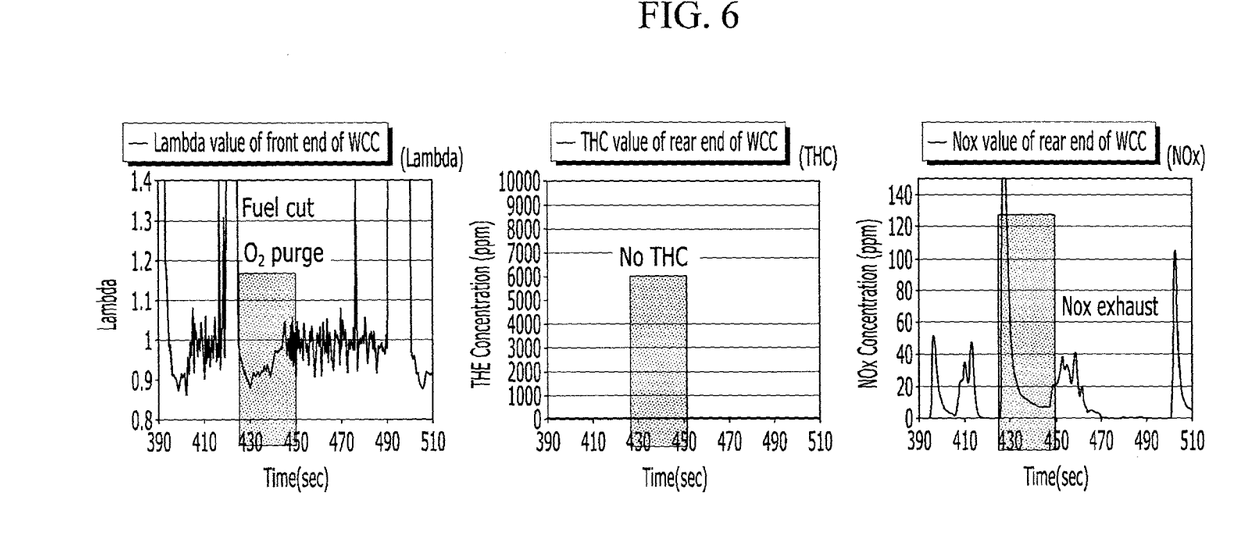
FIG. 6 is a graph illustrating an EM exhaust behavior when a catalyst oxygen purge of a 4 Kmile degraded product is performed during the warm engine period according to an exemplary embodiment of the present invention.
Figure 7:
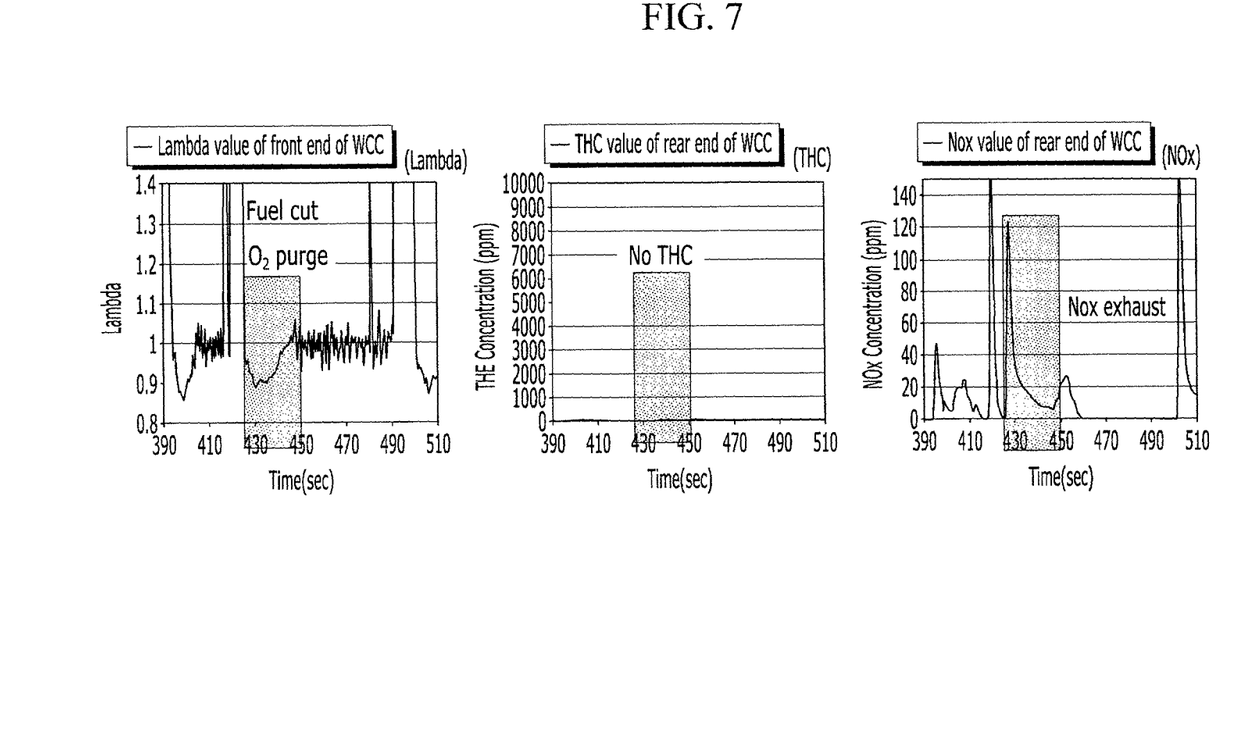
FIG. 7 is a graph illustrating an EM exhaust behavior when a catalyst oxygen purge of a 150 Kmile degraded product is performed during the warm engine period according to an exemplary embodiment of the present invention.

FIG. 6 is a graph illustrating an EM exhaust behavior when a catalyst oxygen purge of a 4 Kmile degraded product is performed during the warm engine period according to an exemplary embodiment of the present invention, and FIG. 7 is a graph illustrating an EM exhaust behavior when a catalyst oxygen purge of a 150 Kmile degraded product is performed during the warm engine period according to an exemplary embodiment of the present invention.

Referring to FIG. 6 and FIG. 7, during the warm engine period when a three way catalyst exhaust temperature is approximately 400° F. or higher after approximately 200 seconds after starting the engine, hydrocarbon is not exhausted but a large amount of nitrogen oxide is exhausted. As illustrated in FIG. 6 and FIG. 7, during the warm engine period, since it is observed that the 4 Kmile degraded product and the 150 Kmile degraded product exhaust a similar amount of nitrogen oxide, it is difficult to shorten the oxygen purge time.

Figure 8:
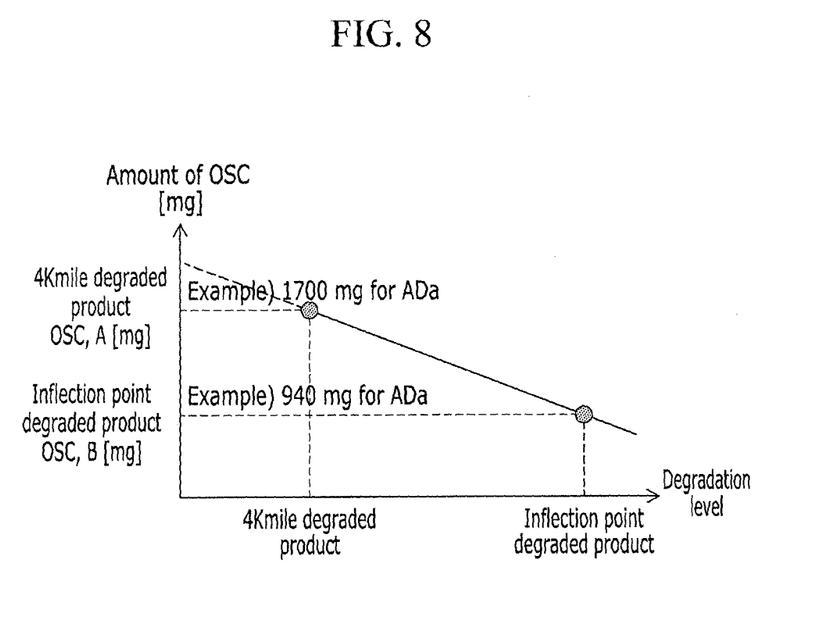
FIG. 8 is a graph illustrating an oxygen storage capacity of a catalyst according to a catalyst heat load according to an exemplary embodiment of the present invention.

FIG. 8 is a graph illustrating the oxygen storage capacity of a catalyst according to a catalyst heat load according to an exemplary embodiment of the present invention.

Referring to FIG. 8, it is understood that as compared with the 4 Kmile degraded product, the oxygen storage capacity of the inflection point degraded product is small. For example, in the case of a gasoline vehicle with a 1.4 liter engine, it is understood that the oxygen storage capacity of a three-way catalyst of a 4 Kmile degraded product is approximately 1700 mg, and the oxygen storage capacity of a three-way catalyst of the inflection point degraded product is approximately 940 mg. The oxygen storage capacity is linearly inversely proportional to a heat load of the three way catalyst.

Figure 9:
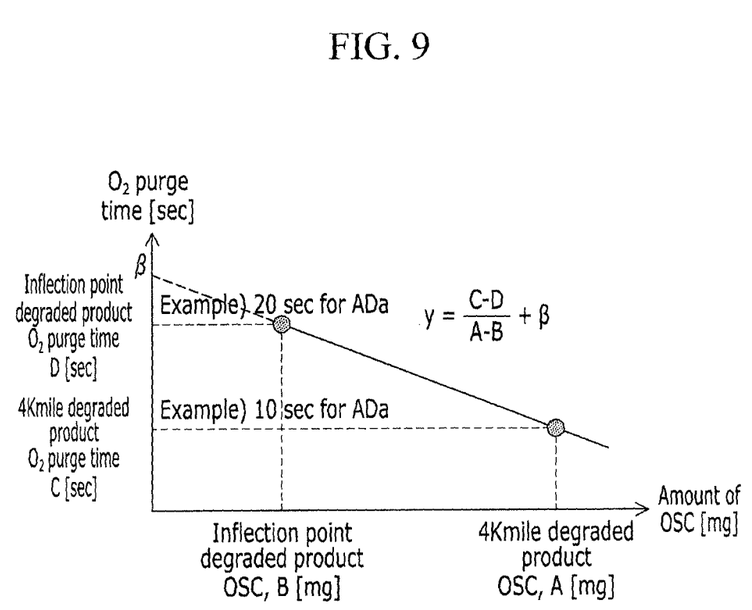
FIG. 9 is a graph illustrating an oxygen purge time according to an oxygen storage capacity of a catalyst according to an exemplary embodiment of the present invention.

FIG. 9 is a graph illustrating an oxygen purge time according to an oxygen storage capacity of a catalyst according to an exemplary embodiment of the present invention.

Referring to FIG. 9, as compared with the 4 Kmile degraded product, the oxygen purge time of the inflection point degraded product is increased. That is, as the oxygen storage capacity is reduced, the oxygen purge time is increased after the fuel cut. In the present case, the oxygen storage capacity is linearly inversely proportional to the oxygen purge time. For example, in the case of a gasoline vehicle with a 1.4 liter engine, an oxygen purge time of a three-way catalyst of a 4 Kmile degraded product is adjusted to approximately 10 seconds, and an oxygen purge time of a three-way catalyst of the inflection point degraded product is adjusted to approximately 20 seconds.

Figure 10:
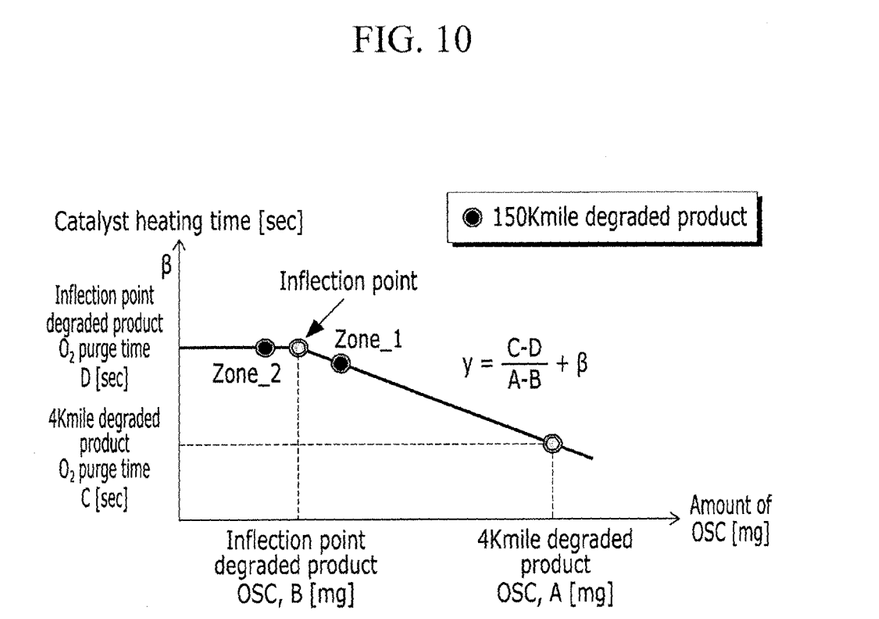
FIG. 10 is a graph illustrating an example of catalyst heating period in a respective control region according to the inflection point of FIG. 3.

FIG. 10 is a graph illustrating an example of catalyst heating period in a respective control region according to the inflection point of FIG. 3.

Referring to FIG. 10, before the inflection point (Zone_1), variation of the OSC according to aging time is large, but EM effect according to the variation of the OSC is small, so controlling the control variable related to the performance of the three way catalyst, that is the catalyst heating time, is easy.

However, after the inflection point (Zone_2), variation of the OSC according to aging time is small, but EM effect according to the variation of the OSC is sensitive, so controlling the control variable related to the performance of the three way catalyst, that is the catalyst heating time, is difficult.

Figure 11:
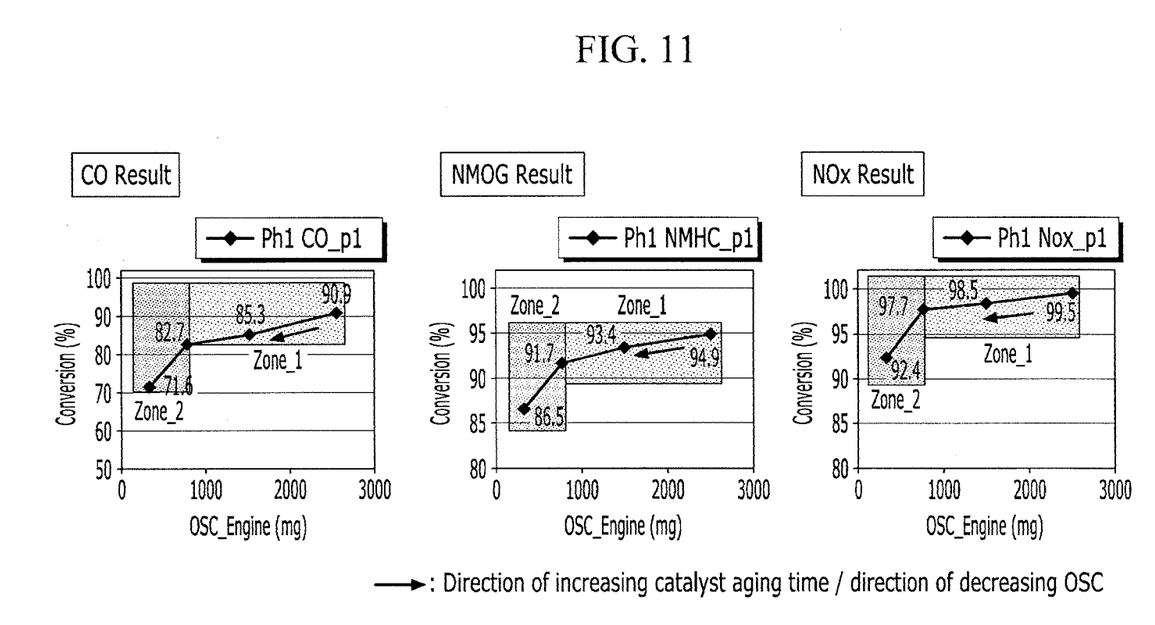
FIG. 11 is a graph comparing exhaust gas purification performances according to a variation of the OSC of the three way catalyst.

FIG. 11 is a graph comparing exhaust gas purification performances according to a variation of the OSC of the three way catalyst.

Referring to FIG. 11, variation of the OSC according to the three way catalyst aging time is large around the inflection point, and exhaust gas purification performance decreases as aging time of the three way catalyst increases and as the OSC decreases. Accordingly, the exhaust gas purification performance varies on the basis of the inflection point, and the purification performance is more reduced after the inflection point (Zone_2) than before the inflection point (Zone_1).

Figure 12:
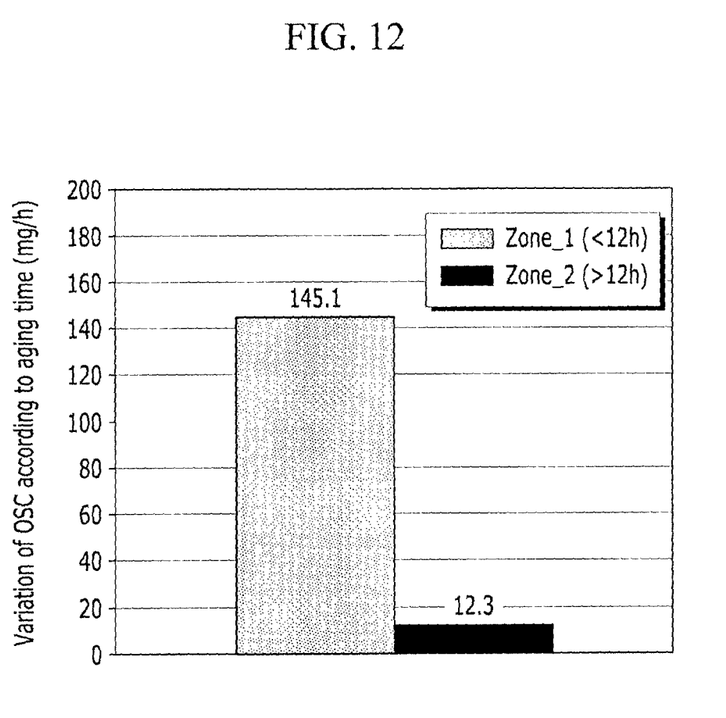
FIG. 12 is a graph illustrating variation of the OSC according to aging time of the three way catalyst in a respective control region according to an exemplary embodiment of the present invention.
Figure 13:
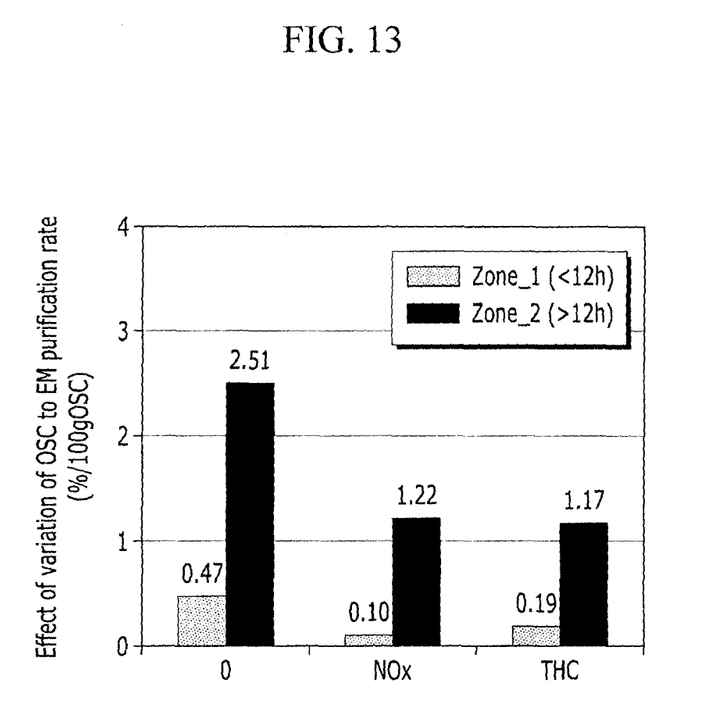
FIG. 13 is a graph illustrating effects that variation of the OSC affects to exhaust gas purification performance.

FIG. 12 is a graph illustrating the variation of the OSC according to aging time of the three way catalyst in a respective control region according to an exemplary embodiment of the present invention, and FIG. 13 is a graph illustrating the effects that the variation of the OSC affects the exhaust gas purification performance.

Referring to FIG. 12, the decreasing amount of the OSC varies on the basis of the inflection point, and the variation tendency is different before the inflection point (Zone_1) and after the inflection point (Zone_2). Before the inflection point (Zone_1) the decreasing rate of the OSC is large, and after the inflection point (Zone_2) the decreasing rate of the OSC is small.

However, referring to FIG. 13, the effect that the variation of the amount of the OSC affects the variation of the EM is not sensitive before the inflection point (Zone_1), but the effect that the variation of the amount of the OSC affects the variation of the EM is sensitive after the inflection point (Zone_2).

Accordingly, the exhaust gas purification apparatus according to an exemplary embodiment of the present invention controls an oxygen purge period related to the performance of the three way catalyst on the basis of the inflection point, as shown in FIG. 9. For example, before the inflection point (Zone_1), the oxygen purge period (C) is controlled to be increased linearly according to amount of the OSC (A) according to the heat load of the catalyst.

Further, after the inflection point (Zone_2), the oxygen purge period (D) is controlled to have a predetermined set value according to the amount of the OSC (B) according to the heat load at the inflection point.

Further, the exhaust gas purification apparatus according to an exemplary embodiment of the present invention controls the catalyst heating period related to the performance of the three way catalyst on the basis of the inflection point, as shown in FIG. 10. For example, before the inflection point (Zone_1), the catalyst heating period (C) is controlled to be increased linearly according to amount of the OSC (A) according to the heat load of the catalyst.

Further, after the inflection point (Zone_2), the catalyst heating period (D) is controlled to have a predetermined set value according to amount of the OSC (B) according to the heat load at the inflection point.

As described above, according to an exemplary embodiment of the present invention, optimum control of the three way catalyst performance is possible and exhaust gas purification performance may be improved by determining an inflection point using the variation amount of the OSC, and controlling an oxygen purge period differently around the inflection point.

For convenience in explanation and accurate definition in the appended claims, the terms "upper", "lower", "internal", "outer", "up", "down", "upwards", "downwards", "front", "back", "rear", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling an exhaust gas purification apparatus as a catalyst oxygen purge control method during a cold engine period of an exhaust gas purification apparatus including a three way catalyst (TWC) converter purifying exhaust gas exhausted from the engine, comprising:
   determining whether a fuel cut condition of an injector which injects a fuel to a combustion chamber is satisfied;
   performing a fuel cut of the injector when the fuel cut condition is satisfied;
   determining heat load of the three way catalyst by use of a temperature detector and an exhaust gas flow rate detector;
   measuring oxygen storage capacity (OSC) stored in the three way catalyst according to the heat load;
   determining an inflection point by use of variation amount of the OSC; and
   controlling oxygen purge period differently around the inflection point.

2. The method of claim 1, wherein the inflection point includes a point that decreasing rate of the variation amount of the OSC is changed.

3. The method of claim 1, wherein in the determining of the inflection point, the heat load determined by accumulating temperature and exhaust gas flow rate of a front end portion of the three way catalyst, and a decreasing rate of the OSC is determined by measuring amount of the OSC according to the heat load, and when absolute value of the decreasing rate of the OSC is below a predetermined value, the inflection point is determined to have passed.

4. The method of claim 1, wherein
   in the controlling of the oxygen purge period differently,
   when the variation amount of the OSC is before the inflection point, the oxygen purge period is configured to be controlled to be increased linearly; and
   when the variation amount of the OSC is after the inflection point, the oxygen purge period is configured to be controlled to have a predetermined set value.

5. The method of claim 1, wherein
   a criteria of the cold engine during the cold engine period is that an exhaust gas temperature at a front end portion of the three way catalytic converter is lower than 400° F. and a time is before an activation of the three way catalyst.

6. The method of claim 1, wherein
   a criteria of the cold engine during the cold engine period is before 200 seconds after starting the engine, and before the activation of the three way catalyst.

7. The method of claim 1, wherein
   the oxygen purge period is configured to be determined by the oxygen storage capacity of the three way catalyst.

8. An exhaust gas purification apparatus, including:
   a three way catalyst (TWC) disposed at an exhaust line which exhaust gas exhausted from an engine passes and changing harmful material including carbon monoxide, hydrocarbon and nitrogen oxide included in the exhaust gas to harmless components;
   an oxygen sensor measuring oxygen storage capacity (OSC) stored in the three way catalyst; and
   a controller configured to determine a heat load of the three way catalyst and controlling oxygen purge period by use of variation amount of the OSC according to the heat load,
   wherein the controller is configured to determine an inflection point in which decreasing rate of the variation amount of the OSC is changed and is configured to control the oxygen purge period differently around the inflection point.

9. The apparatus of claim 8, wherein
   the controller is configured to control the oxygen purge period to be increased linearly when the variation amount of the OSC is before the inflection point, and is configured to control the oxygen purge period to have a predetermined set value when the variation amount of the OSC is after the inflection point.

* * * * *